United States Patent [19]
Armbruster

[11] 4,217,764
[45] Aug. 19, 1980

[54] ROOF MOUNTED MOTOR VEHICLE AIR CONDITIONER

[75] Inventor: Joseph M. Armbruster, Lighthouse Point, Fla.

[73] Assignee: Sheller-Globe Corporation, Toledo, Ohio

[21] Appl. No.: 922,365

[22] Filed: Jul. 5, 1978

[51] Int. Cl.³ .......................... F25B 27/00; B60H 3/04
[52] U.S. Cl. ........................................ 62/323; 62/239; 62/244
[58] Field of Search ............ 62/239, 244, 243, 323 R, 62/DIG. 16; 165/42, 43, 48; 98/31, 40 D

[56] References Cited

U.S. PATENT DOCUMENTS

| | | | |
|---|---|---|---|
| 2,053,206 | 9/1936 | Sargent | 62/244 |
| 2,263,476 | 11/1941 | Sunday | 62/323 R |
| 2,443,472 | 6/1948 | Mayo et al. | 62/323 R |
| 2,475,841 | 7/1949 | Jones | 62/323 R |
| 2,620,636 | 12/1952 | Stanton | 62/244 |
| 2,718,120 | 9/1955 | Wiley | 62/323 R |
| 2,799,143 | 7/1957 | Weigel | 62/244 X |
| 2,869,333 | 1/1959 | Hoiby et al. | 62/239 |

*Primary Examiner*—Lloyd L. King
*Attorney, Agent, or Firm*—Clarence A. O'Brien; Harvey B. Jacobson

[57] ABSTRACT

A roof mounted air conditioning system is disclosed for motor vehicle use, particularly for use with vans and recreational vehicles, comprising a preassembled unit which can be easily installed in any convenient location upon the roof of a motor vehicle. The air conditioning system comprises, preferably in preassembled form, a condenser and associated compressor precharged with refrigerant, an auxiliary internal combustion engine, and an evaporator, where the evaporator depends from a base plate mounted upon the vehicle roof. An alternator with regulator, as well as a starter motor and storage battery, are used in combination with the internal combustion engine. Fuel is supplied to the engine by a standard electric fuel supply pump connected with the vehicle fuel supply tank or a specially provided fuel tank when installed on a travel trailer. The roof mounted air conditioning system is encased in a protective, streamlined cowling. For protection in the event of fire, heat sensors disconnect the fuel pump when a predetermined temperature is reached, and a time delay relay disconnects power-absorbing accessories until the auxiliary engine has operated for a predetermined time.

8 Claims, 7 Drawing Figures

ROOF MOUNTED MOTOR VEHICLE AIR CONDITIONER

BACKGROUND OF THE INVENTION

1. Field of the Invention

The invention relates to a vehicle air conditioning system, more particularly to a preassembled roof mounted recreational vehicle air conditioning system powered by an engine independent of the engine furnishing power to the drive system of the vehicle.

2. Description of the Prior Art

Systems have been developed for providing auxiliary air conditioning to recreational or other vehicles. Illustrative of such systems are the following U.S. patents:

U.S. Pat. No. 3,218,821—Nov. 23, 1965
U.S. Pat. No. 3,841,108—Oct. 15, 1974
U.S. Pat. No. 3,844,130—Oct. 29, 1974
U.S. Pat. No. 3,885,398—May 27, 1975
U.S. Pat. No. 3,984,224—Oct. 5, 1976.

While these patents disclose the basic concept of providing an air conditioning system and auxiliary internal combustion engine for such an air conditioning system in a recreational vehicle, none discloses a preassembled unit precharged with refrigerant and easily adapted to use with vehicles of conventional design, particularly vehicles such as recreational vehicles, including vans, motor homes, travel trailers and the like, having substantially horizontal roofs.

SUMMARY OF THE INVENTION

It is an object of the present invention to provide an air conditioning system for motor vehicles having a generally horizontal roof, the system being easily installed with use of simple hand tools, plus a saber saw.

Another object of the invention is to provide a motor vehicle air conditioning system powered by an auxiliary engine totally independent of the power provided by the vehicle's primary internal combustion engine.

Still another object of the invention is to provide an air conditioning system using the fuel supply of the primary internal combustion engine, thereby making possible operation of the air conditioning system when the vehicle is parked and its primary internal combustion engine is out of operation. An outside source of power, such as many existing vehicle air conditioning system require, for example, through connections to electrical power sources in trailer parks, is avoided with the entirely self-contained power mechanism and fuel supply of the present invention. Furthermore, the power provided is low voltage direct current, such as 12 volts, avoiding hazards associated with 110 volt alternating current Another further object is to furnish an engine oil cooler for the auxiliary engine.

Yet a further object of the invention is to avoid health hazards resulting from attempts to operate air conditioning systems dependent for their powering upon the primary internal combustion engine of the vehicle. Idling of such vehicles to permit operation of such air conditioning systems when the vehicle is parked can result in entry of exhaust fumes into the interior of the vehicle, and prolonged operation, such as overnight operation, could pose a health hazard to occupants of such a vehicle. The present invention avoids these hazards by providing a roof-mounted power source for the air conditioning unit, having provision for adequate dissipation of exhaust fumes.

A still further object is to provide heat-sensing safety devices to shut the system down in the event of fire, and deflecting means to deflect heat and sound upwardly and outwardly away from persons standing around a stationary vehicle.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
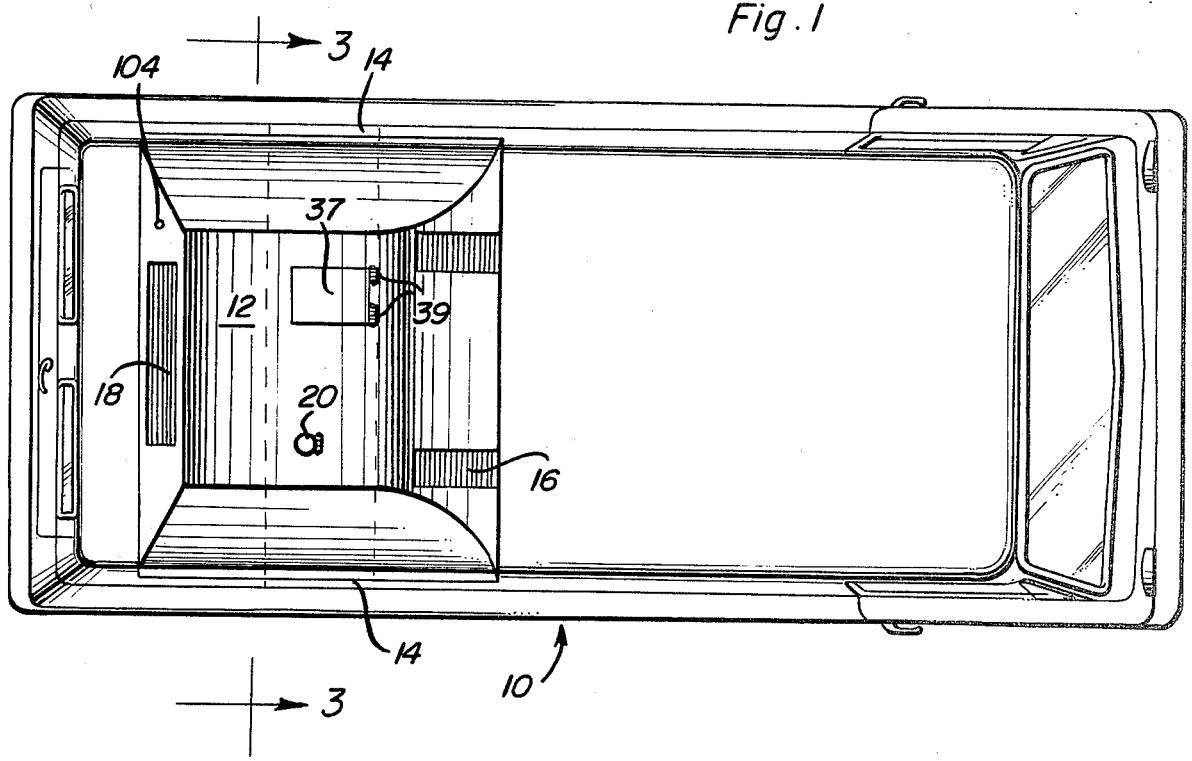
FIG. 1 is a top plan view of a recreational vehicle upon which is mounted the air conditioning unit of the present invention.
Figure 2:
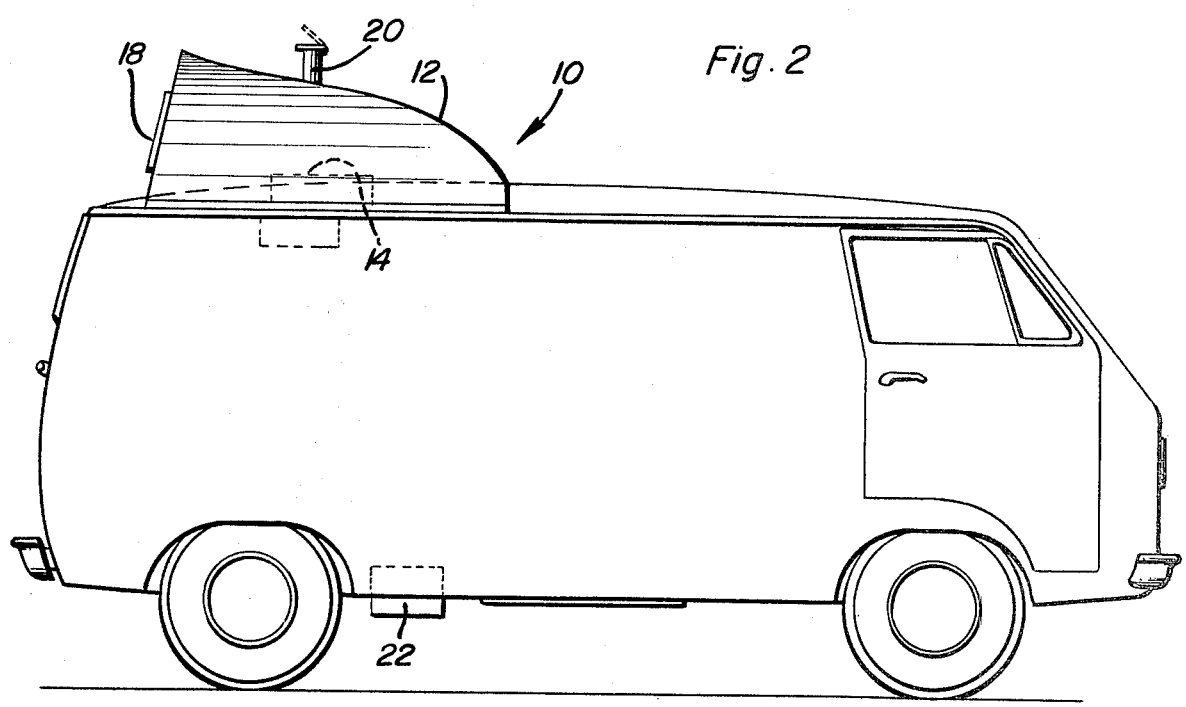
FIG. 2 is a side elevational view of the same recreational vehicle upon which the air conditioning unit is mounted.

In the top view of a recreational vehicle with a roof mounted air conditioning unit of the present invention, designated generally by the numeral 10 in FIG. 1 and in FIG. 2, the cowling 12 is shown, along with a chassis, preferably of aluminum, designated by the numeral 14. Components of air conditioning unit 10 hereinafter described are mounted on chassis 14, which is bolted to the roof 96 of the vehicle by bolts 15. Cowling air inlet 16 comprises a louvered assembly which provides slots for entry of air into cowling 12 while excluding entry of rain or objects from outside. Cowling air outlet 18, also having a louvered assembly, permits exit of warm air generated by operation of the air conditioning unit contained beneath cowling 12. Exhaust pipe 20 projects upward and is capped with rain flap 21, allowing discharge of exhaust gases generated in operation of the air conditioning engine mounted beneath cowling 12. Shown in FIG. 2 is air conditioning system battery 22, mounted upon the vehicle chassis and electrically independent from the usual vehicle battery which is connected to the electrical system of the vehicle.

Figure 3:
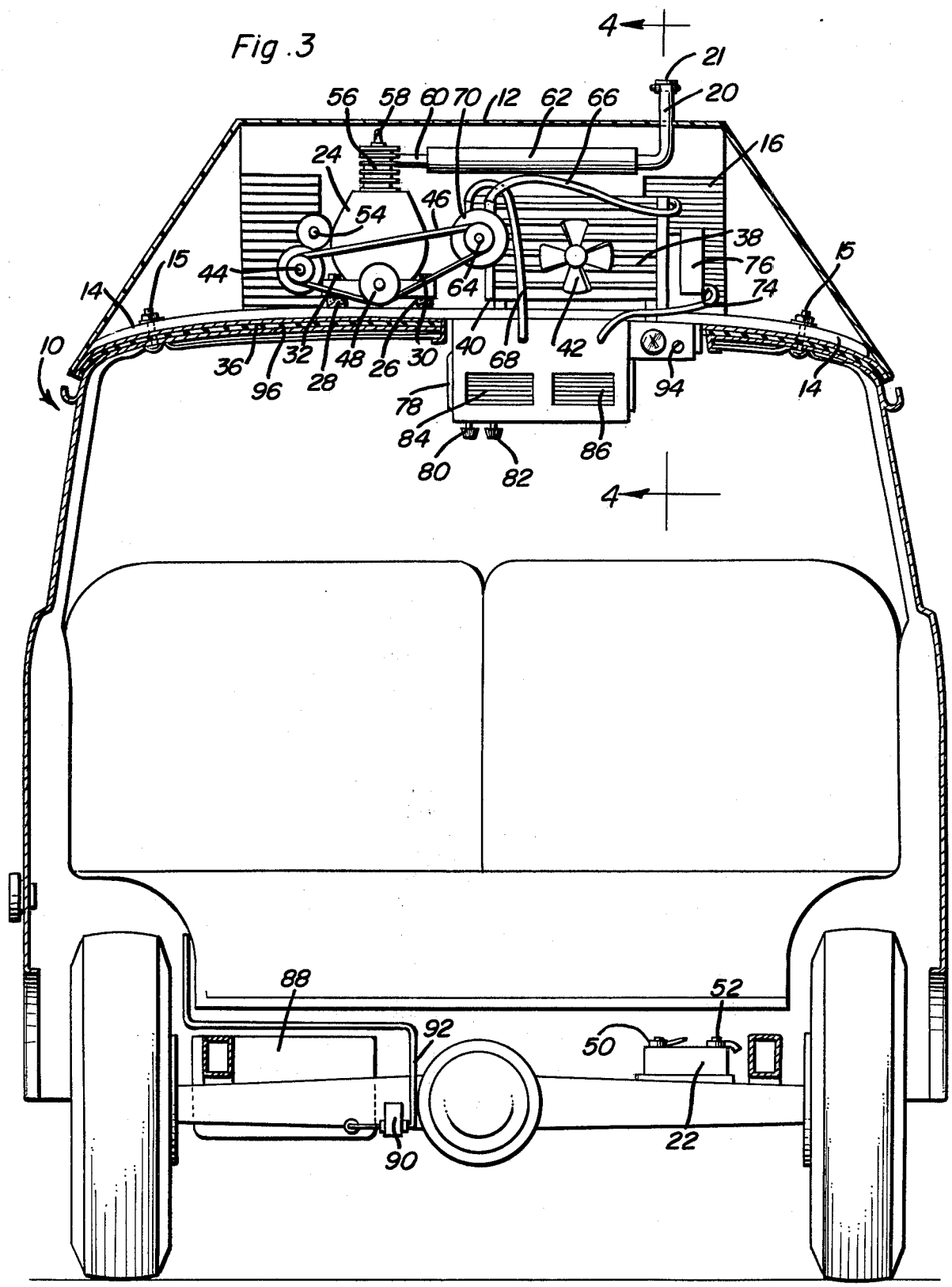
FIG. 3 is a transverse sectional view taken substantially upon a plane passing along section line 3—3 of FIG. 1, showing details of the roof mounted air conditioning system.

Referring now to FIG. 3, auxiliary engine 24 is mounted by spring and rubber engine mounts 26 and 28 with associated engine mounting bolts 30 and 32 upon chassis 14. Chassis 14, resting in turn upon vehicle roof 96, also supports condenser unit 38 through mounting posts, one of which is designated by the numeral 40. Rubber insulator 36 is provided to absorb vibration and protect vehicle roof 96. Auxiliary engine 24 is preferably a four-cycle, single cylinder, air-cooled, internal combustion gasoline engine, generating about ten horsepower, mounted with its driven shaft horizontal, although engines of alternative designs and smaller or larger size are also operable. An oil replenishing tank is used to maintain a full crankcase oil level if manual examination and maintenance of the oil level is to be eliminated. A crankcase pressure oil pump and sensing device draws oil as needed from the tank. An engine oil cooler can be constructed using a cooler oil pump similar to the crankcase pressure oil pump. Auxiliary engine oil is circulated by the cooler oil pump through an oil cooler for heat exchange with ambient air and then is returned to the auxiliary engine.

Compressor 70 preferably has a capacity of six to eight cubic inches and is of the conventional rotary type, and operates with a standard refrigerant, such as dichlorodifluoromethane, or the material known commercially as Freon 12, although many equivalents well-known to those skilled in the art can be substituted with good results. Electric condenser fan 42 is operated from electric power generated by alternator 44, or, alternatively, from power supplied by system battery 22. Alternator 44, powered by two V-belts 46 in mechanical engagement with the driving sheave 48 of auxiliary engine 24, preferably generates about 55 amperes of electrical current at 12 volts direct current, and has in association a voltage regulator (not shown) to permit charging and maintenance of a proper charge of system battery 22. Terminal 50 of system battery 22 is in electrical connection with alternator 44, electric condenser fan 42 and other outlets (not shown) within the vehicle system which can be powered thereby. Battery terminal 52 is attached to the vehicle chassis, constituting a ground, and thereby establishing a return path for electrical current through the vehicle chassis when system electric power consuming or generating devices, such as alternator 44, electric condenser fan 42, or internal appliances, are properly connected to the vehicle chassis ground. System battery 22 must have a designed voltage corresponding to that of alternator 44, electric condenser fan 42, and other system electric that of alternator 44, electric condenser fan 42, and other system electric power consuming devices, and is preferably 12 volts. System battery 22 is preferably bolted to the rear of the vehicle chassis under the vehicle floor, by a mechanism not shown in FIG. 3. Also powered by the electrical system just described is starter 54, which cranks auxiliary engine 24 on start-up. Starter 54 is powered by the electrical system just described when a key switch 94 is closed. Auxiliary engine 24 is cooled through cooling vanes 56, and spark plug 58 operates in a manner well-known to those skilled in the art. Exhaust gas generated by operation of auxiliary engine 24 is discharged into manifold 60, and thence into muffler 62, finally exiting into the outside environment through exhaust pipe 20. A plurality of mufflers connected in series can be substituted for muffler 62. Compressor sheave 64 operates from the same V-belts 46 which operate alternator 44 and sheave 64 is driven by engine sheave 48 or a separate drive pulley and belt may be provided for the compressor with the sheave or pulley 64 including a thermostatically controlled electic clutch conventionally employed in vehicle air conditioner units. The components of the air conditioner unit are conventional and include compressor 70, condenser 38, drier 76, expansion device (not shown), evaporator 72 and connecting hoses 66, 68 and 74. Air inside the vehicle enters the evaporator through evaporator air inlet 78, as shown by arrows in FIG. 3. Within evaporator 72 is a blower (not shown) placed into operation by evaporator blower switch 80, which preferably can be adjusted to a plurality of speeds, for example, three speeds. Temperature regulation is achieved by measurement of internal temperature regulation through thermostat 82. Chilled air is blown from the evaporator 72 through evaporator air outlets 84 and 86 as indicated by arrows in FIG. 3. Auxiliary engine 24 is powered from the gasoline supply of vehicle 10 contained in vehicle gasoline tank 88. Fuel pump 90, powered from the electrical system described above, discharges gasoline fuel into fuel line 92 as required by auxiliary engine 24. Fuel pump 90 has the capability of fuel pressure regulation by means not shown. The unit is started by throwing key switch 94. A time delay relay can be installed in the ignition circuit to permit auxiliary engine 24 to run for a period of time, such as about one minute, before power-absorbing accessories, such as fan 42, and interior outlets, are connected for operation. Further, heat sensing devices can be installed inside cowling 12 to totally interrupt the supply of electric power to electric fuel pump 90 in the event the temperature exceeds a predetermined level, for example, 300° F. Engine 24 will then continue to run until gasoline is exhausted from the float bowl in its supply line. A plurality of sensors can be used, connected in series or otherwise so that disconnection of operation will occur if any one of the plurality is so activated. A convenient number of sensors is three, with two being located on cowling 12 and one located near fuel pump 90.

Figure 4:
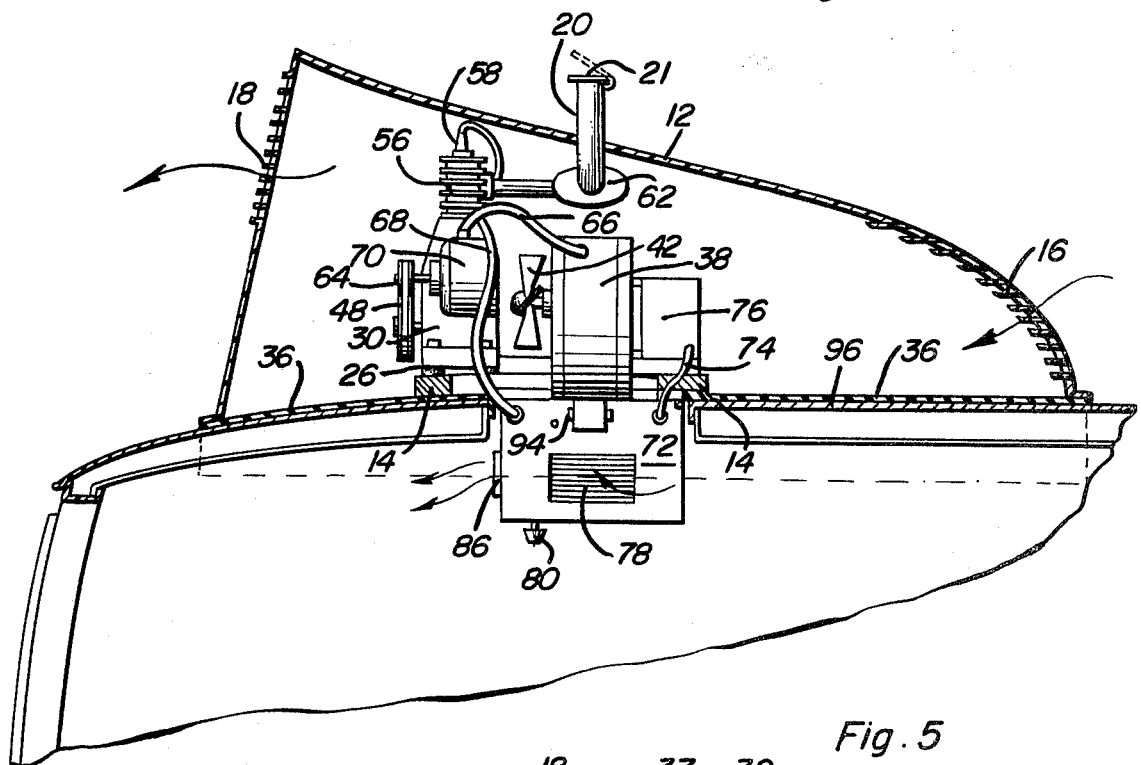
FIG. 4 is a fragmental sectional view taken substantially upon a plane passing along section line 4—4 of FIG. 3, showing details of the roof mounted air conditioning system.

Referring now to FIG. 4, arrows show the flow of outside air into the region enclosed by cowling 12, such outside air entering through cowling air inlet 16, and exiting through cowling air outlet 18. Also shown by arrows is the flow of air within the vehicle, entering through evaporator air inlet 78 and chilled air exiting through evaporator air outlet 86. Chassis 14, rubber insulator 36, and vehicle roof 96 are also shown in FIG. 4. Components can be attached to chassis 14 which is attached to the vehicle roof by conventional fasteners which penetrate the roof, such as bolts 15. Also, the housing or cowling 12 may be hinged to the base plate to facilitate access to the components enclosed thereby. For easy attachment of cowling 12 to chassis 14, clamps or quick-operating quarter-turn fastener is preferred, such as a turn-operated fastener having a stud locked into cowling 12 by a retainer and engaging into a receptacle on chassis 14.

Figure 6:
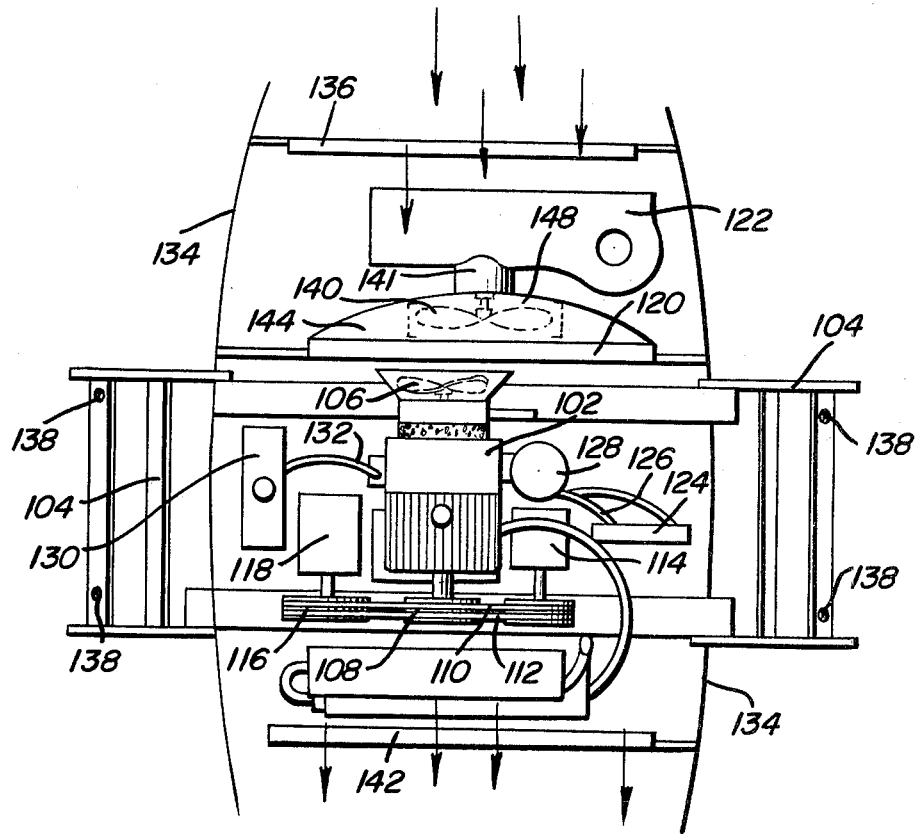
FIG. 6 is a top plan view of another embodiment of an air conditioning unit with the cowling removed.
Figure 7:
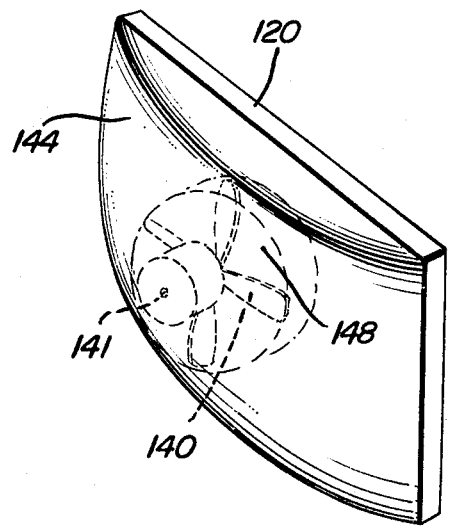
FIG. 7 is a perspective view of the shroud and associated fan of the unit of FIG. 6.

Another embodiment of the invention is shown in FIGS. 6 and 7, with auxiliary engine 102 centrally mounted on chassis 104 and driving engine flywheel fan 106, located in the forward (air inlet) direction, as well as engine sheave 108, located oppositely. Sheave 108 powers two V-belts 110 in mechanical engagement with alternator sheave 112 of alternator 114, as well as compressor sheave 116 of compressor 118, which, along with condenser 120 and vertically depending evaporator 122, constitute, along with other associated conventional components (not shown), an air conditioning unit such as is conventionally employed in motor vehicles. Engine oil cooler 124, along with associated flexible oil lines 126, exchanges heat from oil heated in engine 102 with ambient air. Oil pump 128 provides circulation of engine oil through cooler 124. Oil replenisher tank 130 maintains a proper supply of engine oil in the crankcase compartment of engine 102 by oil level sensing means (not shown) and pumping means (not shown) for transferring oil from tank 130 through line 132 to engine 102 as needed.

Air circulates through the entire region enclosed by cowling 134, entering through air inlet 136 toward the forward end of the vehicle upon which chassis 104 is mounted through mounting holes 138. Air drawn through inlet 136 in the direction indicated by arrows in FIG. 6 passes above evaporator 122 and is forced backwardly by condenser fan 140, which is electrically powered by motor 141 and is operated continuously. Fan 140 forces air through conventional heat exchange elements of condenser 120. Additional heat is absorbed by air in passing engine 102, oil cooler 124 and other components before exiting through air outlet 142, which is preferably a grill constructed to deflect heat and noise upwardly and outwardly to avoid undesirable contact with persons who may be standing adjacent the vehicle. Condenser 120 is sealingly enclosed by and contained within plastic shroud 144, which, along with air dam 146, insures that all air entering the unit rearwardly of condenser 120 passes through aperture 148 in shroud 144. This construction permits air directed onto engine 102 by fan 106 to be augmented by fan 140 when the vehicle is in a stationary position. In addition, one or more heat-sensing devices can be installed in the unit to electrically disconnect the electrically powered fuel pump supplying gasoline or other fuel to engine 102. When a heat-sensing device reaches a predetermined temperature, such as about 300° F., fuel pump disconnection occurs, which provides a measure of safety for protection in the event of fire. An automatic choke with a conventional sensor on the exhaust pipe (not shown) of engine 102 can be used, where the sensor sets the choke position to enable engine 102 to start even when hot. A pulsating oil pump 128 can be used, since the crankcase of engine 102 is not ventilated.

Chassis 104 in FIG. 6 and chassis 14 in FIGS. 2-5 are constructed with extreme ends curved to specification to individually fit standard motor vehicles of various manufacturers, enabling the weight of the engine and other components to be supported without any detrimental effect on the roof of the vehicle. The chassis is so mounted, preferably with bolts and nuts so sized and arranged so that, in case of accident, the chassis cannot be pulled from the vehicle.

Cowling 12 in FIG. 2 and cowling 134 in FIG. 6 are preferably made of fiberglass, but other compositions can be used, such as polyurethane or acrylonitrite-butadiene-styrene resins, or mixtures thereof. Laminated construction can also be used.

When installing the air conditioner on a van or the like, it is only necessary to install a tee fitting in the fuel line to which the fuel pump is connected, install a conventional battery supporting box or brackets and hold down on the chassis at a convenient location and cut a hole in the roof sufficient to receive the evaporator and associated controls therethrough. The preassembled unit is then merely placed on the roof and secured into position after which a simple connection to the fuel line is made and the battery is electrically connected to the unit. The battery is also connected to electrical appliances or outlets into which 12 volt direct current appliances may be plugged.

Figure 5:
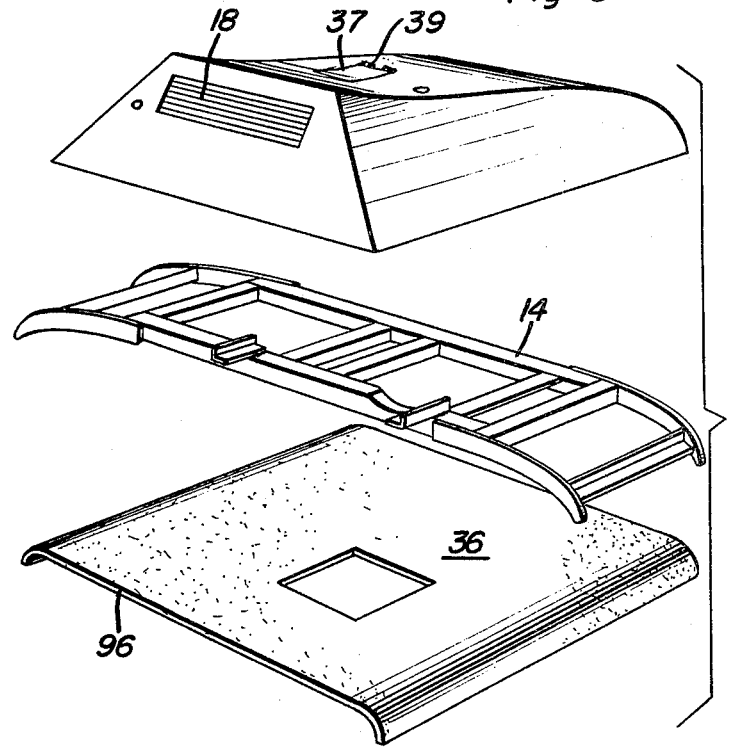
FIG. 5 is a group perspective view of the cowling encasing the air conditioning unit (not shown), the rubber insulator, and the base plate.

FIG. 5 depicts the order of assembly of cowling 12, base plate 34, and rubber insulator 36. Visual observation through port 104 permits an oil check to be made. An upwardly opening door 37 having hinges 39 can be installed on the upper surface of cowling 12 to permit an oil check to be made, to allow addition of oil to engine 24, and to provide for changing of spark plug 58, as necessary. Alternatively, or optionally in addition, air outlet 86 can be constructed as a grill fastened by two screws at its bottom with hinges to permit the grill to swing upwardly, or to disconnect entirely for performance of maintenance operations.

The foregoing is considered as illustrative only of the principles of the invention. Further, since numerous modifications and changes will readily occur to those skilled in the art, it is not desired to limit the invention to the exact construction and operation shown and described and accordingly, all suitable modifications and equivalents may be resorted to, falling within the scope of the invention.

What is claimed as new is as follows:

1. An air conditioning system for a motor vehicle, said vehicle having a generally horizontal roof, comprising a condenser, a compressor, an auxiliary internal combustion engine, and an evaporator, said condenser, compressor and engine being attached atop a chassis mounted upon said roof, said evaporator being attached to the bottom side of said chassis and depending through an opening in said roof into the interior of said vehicle, the vehicle having a primary internal combustion engine powered by gasoline stored in a vehicle fuel tank, the auxiliary internal combustion engine of said air conditioning system being powered from fuel stored in said vehicle fuel tank, said fuel tank having appended thereto an auxiliary fuel pump, said fuel pump being connected to said auxiliary internal combustion engine by a fuel line, the system further including an alternator electrically connected to an auxiliary electric storage battery, said alternator being powered by said auxiliary internal combustion engine, and said battery having power-absorbing accessories switchably in circuit therewith, the system further including an electric starter motor mechanically engageable with said auxiliary internal combustion engine and electrically connected to said auxiliary electric storage battery, wherein said air conditioning system is encased in a streamlined protective fiberglass cowling attached to said chassis by a turn-operated fastener, the system having a layer of rubber insulation between said chassis and said roof, wherein said auxiliary engine is oil lubricated and is connected to an oil cooler connected to an oil cooler pump means for circulating engine oil through said cooler and returning the engine oil to said auxiliary engine, the system further including a time delay relay in circuit with said power-absorbing accessories, said time delay relay preventing electrical connection of said power-absorbing accessories to said battery until passage of a predetermined time after said starter motor starts the auxiliary engine, wherein said fuel pump is electrically powered, and is connected to a heat-sensing device adapted to electrically disconnect said fuel pump when said heat-sensing device reaches a predetermined temperature, the battery having in association therewith a voltage regulator to permit charging and maintenance of a proper charge thereof, the cowling being provided with an air inlet comprising a louvered assembly having slots for entry of air into said cowling while excluding entry of rain or objects from the outside, and the auxiliary internal combustion engine being mounted with its driven shaft horizontal for driving said compressor.

2. The air conditioning system of claim 1 wherein said cowling has laminated construction.

3. The air conditioning system of claim 1 wherein said motor vehicle is a recreational vehicle.

4. The air conditioning system of claim 1 wherein said predetermined time is about one minute.

5. The air conditioning system of claim 1 wherein said auxiliary internal combustion engine has an exhaust manifold for receiving exhaust gases produced by said auxiliary engine, together with a muffler assembly connected to said manifold.

6. The air conditioning system of claim 5 wherein said muffler assembly includes a plurality of mufflers connected in series.

7. The air conditioning system of claim 1 wherein said temperature is about 300° F.

8. A method of mounting the air conditioning system of claim 1 comprising preparing a preassembled unit by preassembling upon said chassis said compressor, said condenser, said auxiliary internal combustion engine, and said evaporator, cutting said opening through said roof, mounting said preassembled unit on said roof, installing a tee fitting in the vehicle fuel line and installing said auxiliary fuel pump thereinto, installing said auxiliary battery and electrically connecting said battery to the engine, starter motor, alternator, and power-absorbing accessories, and installing said cowling over the preassembled unit.

* * * * *